No. 865,837. PATENTED SEPT. 10, 1907.
J. H. WESTON.
CONVEYER AND ELEVATOR.
APPLICATION FILED MAR. 28, 1907.

Witnesses
E. Jenkins
C. H. Griesbauer

Inventor
James Henry Weston
by H. A. Wilson & Co.
Attorneys

UNITED STATES PATENT OFFICE.

JAMES H. WESTON, OF TAMAQUA, PENNSYLVANIA, ASSIGNOR OF ONE-THIRD TO JOHN F. WAGNER AND ONE-THIRD TO GEORGE A. WILFORD, OF TAMAQUA, PENNSYLVANIA.

CONVEYER AND ELEVATOR.

No. 865,837.              Specification of Letters Patent.              Patented Sept. 10, 1907.

Application filed March 28, 1907. Serial No. 365,011.

*To all whom it may concern:*

Be it known that I, JAMES H. WESTON, a citizen of the United States, residing at Tamaqua, in the county of Schuylkill and State of Pennsylvania, have invented certain new and useful Improvements in Conveyers and Elevators; and I do declare the following to be a full, clear, and exact description of the invention, such as will enable others skilled in the art to which it appertains to make and use the same.

This invention is an improved conveyer comprising a chain and flights, which are detachably connected to certain links of the chain, and which may be attached thereto and detached therefrom at will, and it consists in the construction, combination and arrangement of devices hereinafter described and claimed.

Figure 1:
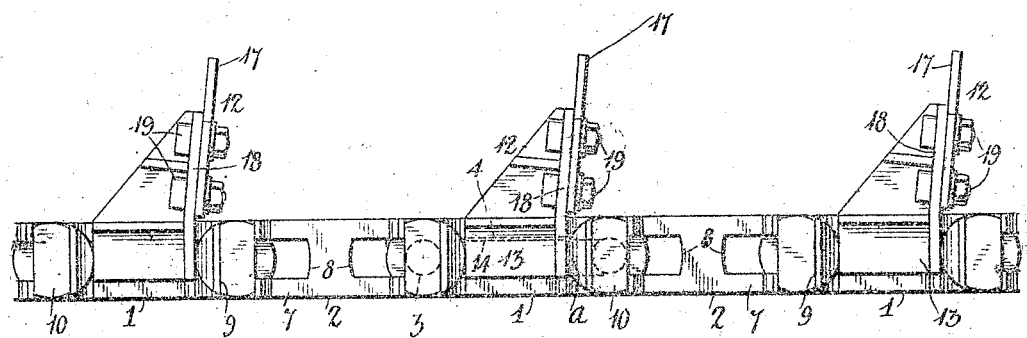
Figure 2:
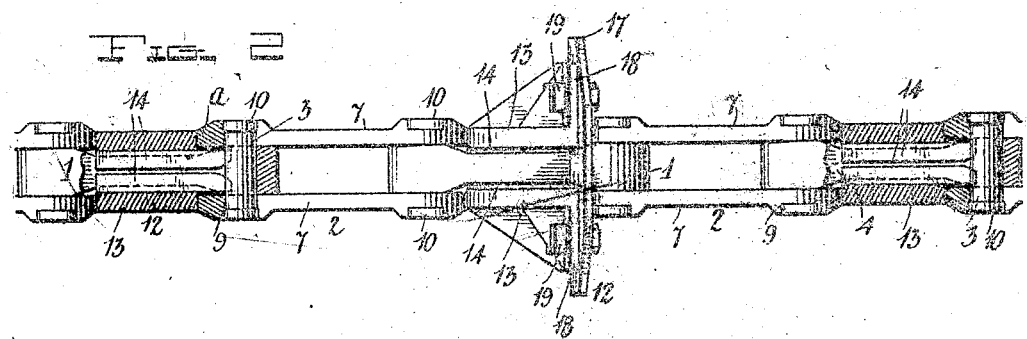
Figure 3:
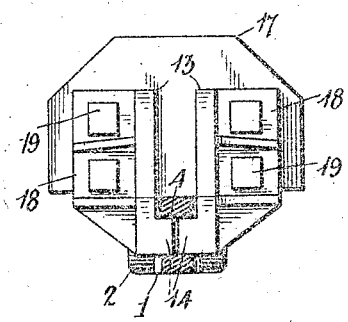
Figure 4:
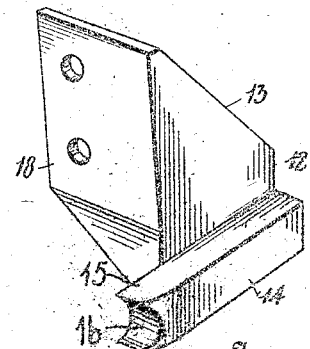

In the accompanying drawings, Figure 1 is a side elevation of a portion of a chain provided with a flight, the chain and flight being constructed in accordance with my invention; Fig. 2 is a top plan view of the same, partly in section; Fig. 3 is a transverse sectional view of the same; and Fig. 4 is a detail perspective view of one of the flight brackets.

The chain here shown is of the construction shown, described and claimed in an application for Letters-Patent, filed by me under date of March 28, 1907, and bearing serial number 365,010, and the said chain comprises links 1, links 2 and locking pins 3, which connect the said links together. Each link 1 is provided with a longitudinal slot 4, which extends nearly from end to end thereof, the link being recessed at opposite sides between its ends to provide broad end portions and an intermediate narrow portion. The links 2 are disposed alternately with reference to the links 1 and each of the said links 2 comprises a pair of laterally-movable separable members 7. Each of said members 7 is provided near its ends with longitudinal slots 8 and is provided on its outer side near its ends with transverse recesses 9, which communicate with said slots and are disposed at the outer ends thereof. The pins 3 connect the links 1 and 2 together, extend through the slots of the said links and are provided at their ends with heads 10, which are flattened on opposite sides and adapted to normally seat in the recesses 9. A link may be detached at any portion of the chain by turning two of the links 1 at right angles to one of the links 2 and moving said links 1 longitudinally until their narrow portions are disposed between the side members of the links 2, whereupon said side members may move toward each other a sufficient distance to unseat the heads 10 from the recesses 9 and permit the pins to be turned and their ends withdrawn through the slots 8.

In accordance with my invention, I provide flights, of which there may be any suitable number, and the said flights may be attached to the chain at suitable distances apart to coact with the chain and form a conveyer.

For the purposes of this specification, I have shown one of the flights, which is designated at 12, and I will now describe the same. In connection with each slotted link 1, to which a flight is to be detachably secured, I provide a pair of bracket members 13, each of which has at its inner end on its inner side an inwardly-extending flange 14, the front end of which projects beyond the front side of the bracket, as at 15, and is concave on its front side, as at 16. The said brackets are disposed on opposite sides of the link 1, to which they are to be attached with their flanges 14 in the slot of said link and their recessed front ends in engagement with the pin 3 in front of said brackets. Said brackets may be thus attached without the necessity of first having to slacken the chain, and when the flanges 14 have been placed in the slot of a link 1, the ends of the brackets bear against the shoulders presented by the ends of the contiguous links 2, and hence said brackets are prevented from moving endwise. The flight is further provided with a member 17, which may serve as the bottom of the flight or for the attachment of the flight bucket, wing or other flight receptacle, and the said member 17 bears against the front sides of the flight brackets, extend transversely across them and across the link 1, to which they are attached, and is secured to outwardly-extending lateral flanges 18, with which such brackets are provided by means of bolts 19, or other suitable devices. The said member 17 thus serves also to secure the brackets together with their flanges 14 in contact with each other and retains the said flanges in the slot of the said link 1. In order to detach the flight, which may be done without the necessity of slackening the chain, the member 17 must be detached from the brackets, and the latter then moved laterally, so as to remove their flanges from the slot of the link 1.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention, as defined by the appended claims.

Having thus described my invention, what I claim as new, and desire to secure by Letters-Patent, is,—

A conveyer chain comprising a plurality of pivotally connected links, one of said links having a longitudinal slot and the adjacent links having their ends overlapping said slotted link to form shoulders, a pair of brackets arranged respectively on opposite sides of the slotted link and having longitudinal inner edge flanges to seat in the slot, said brackets also having radially projecting portions, and a flight element detachably engaged with said portions and serving to connect the brackets for retaining the flanges in the slot, the ends of the brackets being adapted to bear on said shoulders.

In testimony whereof I have hereunto set my hand in presence of two subscribing witnesses.

JAMES H. WESTON.

Witnesses:
CHARLES M. MITCHELL,
JOHN H. MUCKLAW.